United States Patent [19]

Ilnyckyj

[11] 4,354,011

[45] * Oct. 12, 1982

[54] COPOLYMERS OF ETHYLENE AND ETHYLENICALLY UNSATURATED MONOMERS, PROCESS FOR THEIR PREPARATION AND DISTILLATE OIL CONTAINING SAID COPOLYMERS

[75] Inventor: Stephen Ilnyckyj, Kennington, England

[73] Assignee: Exxon Research & Engineering Co., Florham Park, N.J.

[ * ] Notice: The portion of the term of this patent subsequent to May 11, 1995, has been disclaimed.

[21] Appl. No.: 176,209

[22] Filed: Aug. 7, 1980

Related U.S. Application Data

[63] Continuation-in-part of Ser. No. 947,813, Oct. 2, 1978, Pat. No. 4,230,811, which is a continuation of Ser. No. 461,621, Apr. 17, 1974, abandoned.

[51] Int. Cl.$^3$ .................. C08F 4/28; C08F 110/02; C08F 218/02

[52] U.S. Cl. .................. 526/227; 526/331

[58] Field of Search .................. 526/227, 331

[56] References Cited

U.S. PATENT DOCUMENTS

| | | | |
|---|---|---|---|
| 2,497,323 | 2/1950 | Roedel | 260/94.9 |
| 3,770,852 | 11/1973 | Hager et al. | 525/222 |
| 3,981,850 | 9/1976 | Wisotsky et al. | 526/227 |
| 4,230,811 | 10/1980 | Ilnyckyj | 526/227 |

FOREIGN PATENT DOCUMENTS

| | | |
|---|---|---|
| 1263151 | 2/1972 | United Kingdom . |
| 1263152 | 2/1972 | United Kingdom . |

*Primary Examiner*—Harry Wong, Jr.
*Attorney, Agent, or Firm*—Frank T. Johmann

[57] ABSTRACT

Polymers of 1,000 to 50,000 number average molecular weight, comprising 3 to 40 molar proportions of ethylene per molar proportion of an ethylenically unsaturated monomer, are prepared using an ester peroxide as the free radical initiator, in a solvent, for use as wax crystal modifying agents, e.g., pour depressants and flow improvers for middle distillate fuel oil.

3 Claims, No Drawings

COPOLYMERS OF ETHYLENE AND ETHYLENICALLY UNSATURATED MONOMERS, PROCESS FOR THEIR PREPARATION AND DISTILLATE OIL CONTAINING SAID COPOLYMERS

CROSS-REFERENCE TO RELATED APPLICATIONS

This application is a continuation-in-part of U.S. Ser. No. 947,813, filed Oct. 2, 1978, which has issued as U.S. Pat. No. 4,230,811 and which is a Rule 60 continuation of Ser. No. 461,621, filed Apr. 17, 1974, and which is now abandoned.

BACKGROUND OF THE INVENTION

1. Field of the Invention

The present invention relates to ethylene backbone copolymers, distillate oil compositions containing the copolymers, and an improved method of preparing these copolymers for use as pour depressants and flow improvers for distillate oil, which method involves free radical polymerization using an ester peroxide. These copolymers comprise about 3 to 40 molar proportions of ethylene per one molar proportion of an unsaturated monomer other than ethylene and have number average molecular weights in the range of about 1,000 to 50,000.

2. Description of the Prior Art

The commercially most important ethylene-containing pour depressant and flow improvers for distillate oil are copolymers of ethylene and ethylenically unsaturated ester monomers, such as the copolymers of ethylene and vinyl alcohol esters, particularly vinyl acetate, which copolymers are well known in the prior art. For example, U.S. Pat. No. 3,048,479 teaches copolymers of ethylene and $C_3$ to $C_5$ vinyl esters, e.g., vinyl acetate, having molecular weights of about 1,000 to 3,000 according to K. Rast's method of determining mol. wt. (Ber. 55, 1051, 3727, (1922)), as pour depressants for fuels, specifically heating oils, diesel and jet fuels. The copolymers of the examples of said patent were prepared by free radical catalysis, using ditertiary butyl peroxide as the catalyst, (although the patent teaches any peroxide catalyst), at temperatures of 280° to 340° F., in a solvent. U.S. Pat. No. 3,131,168 teaches a free radical process for making ethylene-vinyl acetate copolymers as pour depressants for middle distillate using temperatures up to 440° F., a solvent such as toluene or hexane, any peroxy compound as catalyst, but preferably ditertiary butyl peroxide, and adding additional ethylene to the reaction during the polymerization. U.S. Pat. No. 3,093,623 teaches still another method for making these ethylene-vinyl acetate pour depressants for middle distillates by continuously adding vinyl acetate and ethylene during the course of the reaction. U.S. Pat. No. 3,250,714 teaches ethylene-vinyl acetate copolymers having molecular weights of 3500 to 7000 as V.I. improvers for lubricating oils.

More recently, British Pat. Nos. 1,263,151 and 1,263,152 teach an improvement over the aforesaid U.S. patents by using a polymerization temperature below about 130° C. and acyl peroxide as the initiator, as opposed to the alkyl peroxide, tert. butyl peroxide, and higher temperatures used by the aforesaid U.S. patents. By the technique of said British patents, it was found that the amount of ethylene branching was considerably reduced and copolymers produced by this method were generally superior pour point depressant and flow improvers to prior art copolymers prepared at higher temperatures with alkyl peroxides. Specifically, copolymers prepared with alkyl peroxides and high temperatures, while very effective in treating distillate fuel oil to lower the pour point, frequently result in wax crystals having large particle sizes ranging from one millimeter up to an inch in their largest dimension, depending upon the exact nature of the distillate oil, e.g., crude source, narrowness of the boiling range, etc. While the treated distillate oil containing these large wax crystals exhibits a pour point significantly under the original pour point of the untreated oil, in many cases, the large wax crystals will tend to plug filter equipment and lines normally used on delivery trucks and fuel oil storage systems when the oil is cooled below its cloud point, even though above its pour point. Thus, as the oil containing the pour point depressant is cooled, the cloud point (the point at which the oil becomes cloudy due to crystallization of wax) will generally be reached at a temperature significantly above the pour point (the point at which the oil can no longer conveniently be poured). As a result, oils below their cloud point and above their pour point will be pourable, but at the same time the wax crystals that have formed, if too large, can result in plugging the aforesaid filter equipment. Copolymerizing ethylene and vinyl acetate at a low temperature with the acyl peroxides of said British patents was able to give the good pour point reduction and in addition form smaller wax crystals during cooling of the treated oil.

SUMMARY OF THE INVENTION

The present invention represents a further improvement over the two prior art processes noted above, i.e., (1) using alkyl peroxide and high temperatures, or (2) acyl peroxides and low temperatures. Thus, the present invention uses an ester peroxide, which in general, gives a higher yield of pounds of polymer formed per pound of peroxide than either prior art processes (1) and (2). This is important since the cost of initiator consumed is a relatively large expense in the commercial preparation of these polymers. In addition, the ester peroxide process of the invention can give a polymer which appears to have better solubility characteristics in oil concentrates at low temperatures than similar polymers produced with the acyl peroxide process, i.e., (2) above. This characteristic is important in handling or storage of the polymer concentrates so that separation, or sediment formation, is avoided. The effectiveness of the polymers prepared by the process of the invention in improving the flow characteristics of distillate fuel oil, appears generally superior to the polymers prepared by alkyl peroxide and about equal to those prepared with acyl peroxide.

In brief, the ester peroxides can significantly reduce the initiator cost, as compared to alkyl or acyl peroxides, in the polymerization, and can give polymers as effective in flow improvement as those prepared with acyl peroxides, but with good solubility in concentrates; and can give polymers better in flow improvement than the polymers prepared with alkyl peroxides.

The polymers of the invention will consist essentially of about 3 to 40, and preferably 3 to 20 molar proportions of ethylene per mole proportion of ethylenically unsaturated monomer, which latter monomer can be a single monomer or a mixture of such monomers in any proportion, said polymer being oil-soluble and having a number average molecular weight in the range of about 1,000 to 50,000, preferably about 1,000 to about 5,000, as measured by Vapor Phase Osmometry, for example by using a Mechrolab Vapor Phase Osmometer Model 310A.

The unsaturated monomers, copolymerizable with ethylene, include unsaturated mono and diesters of the general formula:

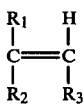

wherein $R_1$ is hydrogen or methyl; $R_2$ is a —$OOCR_4$ or —$COOR_4$ group wherein $R_4$ is hydrogen or a $C_1$ to $C_{16}$, preferably a $C_1$ to $C_4$, straight or branched chain alkyl group; and $R_3$ is hydrogen or —$COOR_4$. The monomer, when $R_1$ and $R_3$ are hydrogen and $R_2$ is —$OOCR_4$, includes vinyl alcohol esters of $C_2$ to $C_{17}$ monocarboxylic acids, preferably $C_2$ to $C_5$ monocarboxylic acids. Examples of such esters include vinyl acetate, vinyl isobutyrate, vinyl laurate, vinyl myristate, vinyl palmitate, etc. When $R_2$ is —$COOR_4$, such esters include methyl acrylate, methyl methacrylate, lauryl acrylate, palmityl alcohol ester of alpha-methyl-acrylic acid, $C_{13}$ Oxo alcohol esters of methacrylic acid, etc. Examples of monomers wherein $R_1$ is hydrogen and $R_2$ and $R_3$ are —$COOR_4$ groups, include mono and diesters of unsaturated dicarboxylic acids such as: mono $C_{13}$ Oxo fumarate, di-$C_{13}$ Oxo fumarate, diisopropyl maleate, dilauryl fumarate, ethyl methyl fumarates, etc.

As previously mentioned, about 3 to 40 moles of ethylene will be used per mole of other monomer, which other monomer is preferably an ester as hereinbefore defined, or a mixture of about 30 to 99 mole % ester and 70 to 1 mole % of a $C_3$ to $C_{16}$, preferably $C_4$ to $C_{14}$, branched or straight chain alpha monoolefin. Examples of such olefins include propylene, n-octene-1, n-decene-1, etc.

In general, the polymerizations can be carried out as follows: Solvent and a portion of the unsaturated ester, e.g., 0–50, preferably 10 to 30 wt. %, of the total amount of unsaturated ester used in the batch, are charged to a stainless steel pressure vessel which is equipped with a stirrer. The temperature of the pressure vessel is then brought to the desired reaction temperature and pressured to the desired pressure with ethylene. Then initiator and additional amounts of unsaturated ester are added to the vessel continuously, or at least periodically, during the reaction time, which continuous addition gives a more homogeneous copolymer product as compared to adding all the unsaturated ester at the beginning of the reaction. Also during this reaction time, as ethylene is consumed in the polymerization reaction, additional ethylene is supplied through a pressure controlling regulator so as to maintain the desired reaction pressure fairly constant at all times. Following the completion of the reaction, the liquid phase of the pressure vessel is distilled to remove the solvent and other volatile constituents of the reacted mixture, leaving the polymer as residue.

Usually, based upon 100 parts by weight of copolymer to be produced, then about 100 to 600 parts by weight of solvent, and about 0.1 to 5, e.g., about 0.5 to 3 parts by weight of initiator, will be used.

The solvent can be any substantially non-reactive organic solvent for furnishing a liquid phase reaction which will not poison the initiator or otherwise interfere with the reaction. Examples of solvents which may be used include $C_5$ to $C_{10}$ hydrocarbons, which can be aromatic such as benzene, toluene, etc.; aliphatic such as n-heptane, n-hexane, n-octane, isooctane, etc.; cycloaliphatic such as cyclohexane, cyclopentane, etc. Various polar solvents may also be used such as hydrocarbyl esters, ethers and ketones of 4 to 10 carbon atoms such as ethyl acetate, methyl butyrate, acetone, dioxane, etc. may also be used. A particularly preferred solvent is cyclohexane which is easily handled and which gave very good utilization of the initiator.

The temperature used during the reaction will generally be in the range of from 150° to 350° F., e.g., 200°–270° F., preferably about 200° to 250° F.

Preferred free radical initiators are those which have a half life of less than about six hours at 110° C. These initiators are hydrocarbon soluble, ester peroxides of the general formula:

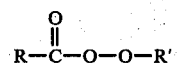

where R and R' are each hydrocarbon groups, such as alkyl, aryl, alkaryl, cycloalkyl, etc., preferably alkyl groups, either straight chain or branched chain, of 2 to 20, e.g., 4 to 12 carbon atoms each. Usually the ester peroxide will contain a total of 4 to 24, preferably 6 to 18, carbon atoms. Some specific examples of such ester peroxides include: t-butyl peroxypivalate, t-butyl peroctanoate (i.e., t-butyl peroxy-2-ethylhexanoate), t-butyl peroxyisobutyreate, t-butyl peracetate, t-butyl perbenzoate, etc.

The pressures employed can range between 500 to 30,000 psig. However, relatively moderate pressures of 700 to about 3,000 psig. will generally suffice with vinyl esters such as vinyl acetate. In the case of esters having a higher relative reactivity to ethylene, such as methyl methacrylate, then somewhat higher pressures, such as 3,000 to 10,000 psi have been found to give more optimum results than lower pressures. In general, the pressure should be at least sufficient to maintain a liquid phase medium under the reaction conditions, and to maintain the desired concentration of ethylene in solution in the solvent.

The time of reaction will depend upon, and is interrelated to, the temperature of the reacton, the choice of catalyst, and the pressure employed. In general, however, ½ to 10, usually 2 to 5 hours will complete the desired reaction.

The polymers of the invention will generally be added to distillate hydrocarbon oils in amounts of 0.001 to 2 wt. %, generally 0.005 to about 0.5 wt. %, said wt. % being based upon the weight of the oil to be treated.

The distillate hydrocarbon oils, which are treated for pour depression with the polymers of this invention, include cracked and virgin distillate oils boiling in the range of 250° to 750° F., such as heating oil and diesel fuel oil.

The polymers of the invention may be used alone as the sole oil additive, or in combination with other oil additives such as other pour depressants or dewaxing aids; corrosion inhibitors; antioxidants; sludge inhibitors; etc.

The invention will be further understood by reference to the following examples which include preferred embodiments of the invention.

EXAMPLE I

A stirred autoclave was charged with 4500 ml. of cyclohexane as solvent and 500 ml. of vinyl acetate. The autoclave was then purged with nitrogen and then with ethylene. The autoclave was then heated to about 220° F., while ethylene was pressured into the autoclave until the pressure was raised to 1050 psig. Then, while maintaining a temperature of 220° F. and said 1050 psig. pressure, 1249 ml. of vinyl acetate was injected at a constant rate over a two hour period. At the same time, 30 grams of t-butyl peroctanoate diluted with 757 ml of cyclohexane was also slowly pumped into the reactor over the two hour period at a constant rate. At the end of said two hour period, and after the last of said vinyl acetate and peroxide was injected, the batch was maintained at 220° F. for an additional 10 minutes. Then, the temperature of the reactor contents was lowered to about 60° C., the reactor was depressurized, and the contents were discharged from the autoclave. The product was then stripped of the solvent and unreacted monomers. The final stripped product consisted of about 1577 grams of copolymer of ethylene and vinyl acetate.

EXAMPLES II TO VII

Examples II to VII were carried out following the general procedure of Example I, except that changes in pressure, temperature, or amount of peroxide were made.

Comparisons A and B

These comparison examples were carried out using the same general technique as in Example I, except that 54.5 grams of lauroyl peroxide (an acyl peroxide) was used in place of the 30 grams of tert. butyl peroctanoate. Also, the lauroyl peroxide (as it is a solid) was added as a solution dissolved in 757 ml. of cyclohexane so it could be pumped.

Concentrates of all the above polymers were made by dissolving 45 wt. % of the polymer in 55 wt. % of a heavy aromatic naphtha (HAN) for ease in further handling.

The polymers were tested for flow improving ability at temperatures below the cloud point in a "Cold Filter Plugging Point Test" (CFPPT) which is described in detail in Journal of the Institute of Petroleum, Volume 52, Number 510, June 1966, pp. 173-185. In brief, the Cold Filter Plugging Point Test is carried out with a 45 ml. sample of the oil to be tested which is cooled in a bath maintained at about −30° F. Every two degrees drop in temperature, starting from 4° F. above the cloud point, the oil is tested with a test device consisting of a pipette to whose lower end is attached an inverted funnel. Stretched across the mouth of the funnel is a 350 mesh screen having an area of about 0.45 square inch. A vacuum of about 7" of water is applied to the upper end of the pipette by means of a vacuum line while the screen is immersed in the oil sample. Due to the vacuum, oil is drawn across the screen up into the pipette to a mark indicating 20 ml. of oil. The test is repeated with each two degrees drop in temperature until the vacuum fails to fill the pipette to the aforesaid mark due to clogging of the screen with wax crystals. The results of the test are reported as the "operability limit" or cold filter plugging point (CFPP), which is the temperature at which the oil no longer flows.

Test Fuel A was a diesel fuel boiling in the range of about 172° to 353° C., having a cloud point of −3° C., an aniline point of 73° C., a specific gravity of 0.8193 and a viscosity of 2.64 cs. at 100° F. This fuel in the CFPPT gave a plugging point at about +28° F.

A series of blends of 0.02 wt. % of the aforesaid polymer concentrates in Fuel A were made up and then tested in the CFPPT in duplicate tests, i.e., each blend was tested twice in the CFPPT.

Table I, which follows, summarizes the preparation details of the aforesaid Examples, and Comparisons A and B, along with the yields, and effectiveness in Test Fuel A.

TABLE I

|  | I | II | III | IV | V | VI | VII | Comparison A | B |
|---|---|---|---|---|---|---|---|---|---|
| Polymer Preparation | | | | | | | | | |
| Peroxide Initiator | Peroctanoate | Peroctanoate | Peroctanoate | Peroctanoate | Peroctanoate | Peroctanoate | Peroctanoate | Lauroyl | Lauroyl |
| Reaction Temp., °F. | 220 | 250 | 220 | 250 | 250 | 235 | 235 | 220 | 220 |
| Reaction Pressure, psig. | 1050 | 1050 | 1150 | 1150 | 1150 | 1150 | 1050 | 1050 | 1050 |
| Initial Charges | | | | | | | | | |
| Cyclohexane, ml. | 4500 | 4500 | 4500 | 4500 | 4500 | 4500 | 4500 | 4500 | 4500 |
| Vinyl Actate, ml. | 500 | 500 | 500 | 500 | 500 | 500 | 500 | 500 | 500 |
| Injection Charges over 2 hrs. | | | | | | | | | |
| Vinyl Acetate ml. | 1249 | 1249 | 1249 | 1249 | 1249 | 1249 | 1249 | 1249 | 1249 |
| Initiator [1] gm. | 30 | 30 | 30 | 30 | 24 | 24 | 18 | 54.5 | 54.5 |
| Polymer Properties | | | | | | | | | |
| Yield, gm. | 1577 | 1526 | 1933 | 2296 | 2630 | 2660 | 2618 | 1987 | 1966 |
| Yield, (gm. Polymer/gm. Initiator) | 52.6 | 50.9 | 64.4 | 76.5 | 109.6 | 110.8 | 145.4 | 36.5 | 36.1 |
| Visc., cs. at 100° F. of 45% Polymer in HAN | 130 | 79.4 | 139 | — | 73.2 | 91.6 | 100.5 | 155 | 128 |
| % Vinyl Acetate (By Sap. No.) | — | 13 | — | — | 35.9 | 33.9 | 34.8 | 35.9 | 35.1 |
| Flow Improvement, CFPPT, °F. | | | | | | | | | |
| Fuel A + 0.02% Concentrate | 8,8 | 20,20 | 8,6 | 6,6 | 6,6 | 6,6 | 10,12 | 8,8 | 6,6 |

[1] Dissolved in 757 ml. of cyclohexane

As seen by Table I, the use of the t-butyl peroctanoate (i.e., t-butyl peroxy-2-ethyl-hexanoate) gave higher yields of polymer per amount of initiator than the lauroyl peroxide. Specifically, Examples I to VII gave yields ranging from 50.9 to 145 grams of polymer per gram of initiator, as compared to the di-lauroyl peroxide which in Comparisons A and B gave 36.5 and 36.1 grams of polymer per gram of initiator, respectively. Since the molecular weight of the peroctanoate peroxide is about 54% that of the dilauroyl peroxide, one could have expected about 85% increase in yield. Yet, Examples V to VII show a much greater yield using the peroctanoate than would have been expected from mere molecular weight differences. At the same time, the sets of duplicate runs in the CFPPT show that about comparable flow improvement could be obtained with the polymer prepared by the peroctanoate as opposed to the dilauroyl peroxide.

EXAMPLES VII TO XII AND COMPARISON POLYMERS C AND D

These polymers were prepared following the general procedure of Example I under the specific conditions noted in Table II.

yields were obtained with the t-butyl peroxy acetate and the t-butyl octanoate.

The polymers of Table II were made up as 45 wt. % concentrates in 55 wt. % diluent hydrocarbon oil for ease of handling. These polymers were tested in the aforesaid Cold Filter Plugging Print Test (CFPPT) in the following middle distillate fuels whose characteristics are summarized in Table III. The CFPP test results are summarized in Table IV.

TABLE III

| Fuel Charateristics | | | |
|---|---|---|---|
| | | Fuel | |
| Distillation, ASTM D-1160 | B | C | D |
| Boiling Range, °C. | | | |
| IBP | 166 | 177 | 184 |
| 20% | 204 | 222 | 249 |
| 50% | 249 | — | — |
| 80% | 305 | 317 | — |
| 90% | 327 | 338 | 351 |
| FBP | 348 | 362 | 383 |
| Cloud Point °C. | −6 | +2 | +2 |
| Wax Appearance Point, °C. | −7 | 0 | −1 |

TABLE II

| Polymer Preparation and Properties | | | | | | | |
|---|---|---|---|---|---|---|---|
| | VIII | IX | X | XI | XII | C | D |
| Polymer Preparation | | | | | | | |
| Peroxide Initiator | t-butyl peroxy-acetate | t-butyl peroxy-acetate | t-butyl peroxy-acetate | t-butyl peroxy-octanoate | t-butyl peroxy-octanoate | di-lauroyl | di-lauroyl |
| Reaction Temp., °F. | 220 | 250 | 250 | 220 | 250 | 220 | 250 |
| Reaction Pressure, psig. | 1050 | 1050 | 1050 | 1050 | 1050 | 1050 | 1050 |
| Initial Charges | | | | | | | |
| Cyclohexane, ml. | 1260 | 1260 | 1274 | 1260 | 1260 | 1260 | 1260 |
| Vinyl Acetate, ml. | 140 | 140 | 126 | 140 | 140 | 140 | 140 |
| Injection Charges Over 2 hr. | | | | | | | |
| Vinyl Acetate, ml. | 350 | 350 | 315 | 350 | 350 | 350 | 350 |
| Initiator, (1) gm. | 5.15 | 5.15 | 5.15 | 8.4 | 8.4 | 15.7 | 15.7 |
| Soak time, minutes | 10 | 10 | 10 | 10 | 10 | 10 | 10 |
| Polymer Properties | | | | | | | |
| Yield, gm. | 281 | 664 | 610 | 649 | 767 | 659 | 714 |
| Yield, (gm. Polymer/gm. Initiator) | 54 | 129 | 118 | 77 | 99 | 42 | 46 |
| Specific Viscosity at 37.8° C. (2w/v% toluene) | 0.27 | 0.25 | 0.25 | 0.31 | 0.24 | 0.28 | 0.24 |
| % Vinyl Acetate (By Sap. No.) | 44.5 | 40.5 | 38.8 | 36.5 | 35.7 | 36.9 | 39.6 |
| % Vinyl Actate Conversion | 34 | 74 | — | 65 | 75 | 67 | 78 |
| Molecular Weight $M_n$, (VPO) | 3125 | 2425 | — | 2475 | 1925 | 2200 | 1850 |
| Branching, $CH_3/100\ CH_2$ | 4.3 | 5.5 | — | 4.1 | 5.5 | 4.8 | 5.7 |

(1) Dissolved in 240 ml. of cyclohexane

As seen by Table II, ethylene-vinyl acetate copolymers are prepared under conditions of 220° F. and 250° F. for each of the t-butyl peroxy acetate, the t-butyl peroxy octanoate and di-lauroyl peroxide. Looking at the yield in terms of grams of polymer per gram of

| | | | |
|---|---|---|---|
| Aniline Point, °C. | 73 | 68 | — |
| Wt. % Wax, 10° C. below WAP | 2.8% | 2.1% | 1.7% |
| Carbon Number of Wax | 16 to 27 | 16 to 28 | 16 to 29 |
| CFPPT, °C. | −7 | 0 | −2 |

TABLE IV

| Polymer As Flow Improver | | | | | | | |
|---|---|---|---|---|---|---|---|
| | CFPPT, °C., of Fuel with Polymer | | | | | | |
| Polymer Preparation | VIII | IX | X | XI | XII | C | D |
| Fuel B + 400 ppm Concentrate* | −8 | −9 | — | −11 | −9 | −11 | −9 |
| + 600 ppm Concentrate | −11 | −12,−12 | — | −14 | −14,−15 | −13 | −15,−15 |
| Fuel C + 400 ppm Concentrate* | 0 | −7, −9 | −6,−8 | −8 | −8,−9 | −9 | −9,−10 |
| +600 ppm Concentrate | 0 | −10,−10 | — | −14 | −11,−11 | −10 | −11,−11 |
| Fuel D + 100 ppm Concentrate* | −2 | −3 | — | −4 | −4 | −6 | −3 |
| + 200 ppm Concentrate | −2 | −7 | — | −11 | −10 | −12 | −10 |

*Concentrates were 45 wt. % polymer in 55 wt. % diluent oil.

initiator, it is seen that relatively low yields are obtained with the di-lauroyl peroxide, while considerably higher When considering the polymer effectiveness in the oil as shown in Table IV in view of the polymer properties summarized in Table II, comparisons are best made between polymers with substantially comparable vinyl acetate contents since this is a factor in determining the response in these oils.

Consider in Table II the preparations at 220° F., Polymer C using the dilauroyl peroxide gave a polymer of 36.9% vinyl acetate, a specific viscosity of 0.28, when measured at a polymer concentration of 2 grams of polymer per 100 ml. of toluene, a number average molecular weight by vapor phase osmometry (VPO) of 2200 and had about 4.8 methyl terminating branches per 100 methylenes, exclusive of the methyls of the vinyl acetate linkages, as determined by nuclear magnetic resonance (NMR) using a 220 megahertz NMR machine. Comparing Polymer C in Table II, with that of Example XI produced at 220° F. with the t-butyl peroctanoate, it is seen that the two polymers are roughly equivalent in properties with essentially comparable vinyl acetate content. As shown in Table IV, C and Example IX gave about the same degrees of effectiveness in the fuel oils. Example VIII made at 220° F. with the desired peroxyacetate showed some effectiveness in Fuel B, but not in C or D; however, its vinyl acetate content (see Table II) was particularly high which precluded comparison in these particular test oils. Now consider the polymers made at 250° F. and the response in Fuels B, C and D, comparing Polymer D having a vinyl acetate content of 39.6 wt. % with Example XII having 35.7 wt. % vinyl acetate, both polymers having comparable molecular weights, degree of branching etc. Similar CFPP results in the Fuels B, C and D were obtained with XII and D. Compare Examples IX and X with Comparison Polymer D. All were made at 250° F. and had comparable vinyl acetate contents. Again, it is seen that the response in the Test Fuels were about comparable. Since the polymers of Examples IX and X made with t-butyl peroxyacetate gave considerably greater yields of polymer per gram of initiator (see Table II) than peroctanoate of Example XII or the dilauroyl peroxide of Comparison Polymer D, it is seen that a considerable savings in the process can be obtained by selection of the initiator while obtaining polymers with comparable effectiveness as distillate oil flow improvers.

In brief summary, where the comparisons were made between polymers with similar properties, similar results were obtained in the test oils, regardless of which of the three initiators were used in Table II. However, as also shown by Table II, a considerable improvement in initiator yields were obtained by the ester peroxides, particularly the t-butyl peroxyacetate.

What is claimed is:

1. In a method of preparing an oil-soluble copolymer of ethylene and vinyl acetate useful as a middle distillate fuel oil flow improver for depressing the pour point of said oil and limiting the size of wax crystals that form on cooling said oil below its cloud point, by free radical initiation, wherein said copolymer has a number average molecular weight by Vapor Phase Osmometry in the range of 1,000 to 5,000 and consists essentially of about 3 to 20 molar proportions of ethylene per molar proportion of vinyl acetate, which method comprises copolymerizing said monomers in a liquid phase reaction in about 100 to 600 parts by weight of $C_5$ to $C_{10}$ hydrocarbon solvent based upon 100 parts by weight of copolymer to be produced, at a temperature of about 200° to 270° F. under an ethylene pressure of about 700 to 3,000 psig. sufficient to maintain a liquid phase medium and to maintain the desired concentration of ethylene solution in the solvent, the improvement which comprises using about 0.1 to 5 parts by wt. of t-butyl peroxyacetate as initiator per 100 parts by wt. of copolymer to be produced.

2. In a method according to claim 1, wherein said monomers are copolymerized at a temperature of about 200° to 250° F.

3. In a method according to claim 1, wherein said solvent is cyclohexane.

* * * * *